(No Model.)
W. & J. MAIDEN & E. F. COWLEY.
MACHINE FOR THREADING AND CUTTING OFF TUBES.
No. 301,613. Patented July 8, 1884.
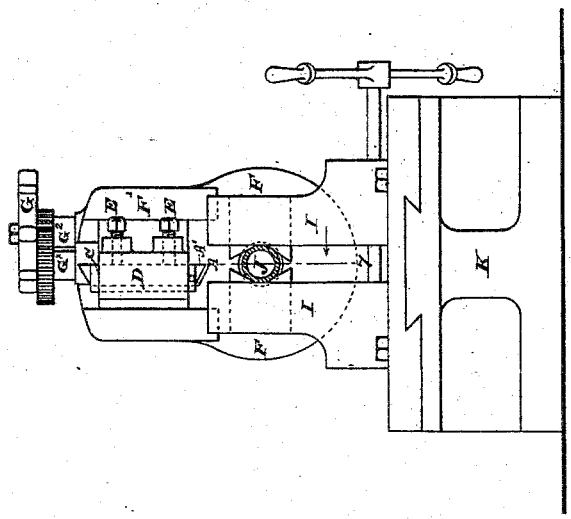
WITNESSES
Ed. A. Newman,
Al. E. Newman,
INVENTORS
William Maiden,
James Maiden,
Egbert F. Cowley,
By their Attorney

UNITED STATES PATENT OFFICE.

WILLIAM MAIDEN, JAMES MAIDEN, AND EGBERT FLETCHER COWLEY, OF HYDE, COUNTY OF CHESTER, ENGLAND.

MACHINE FOR THREADING AND CUTTING OFF TUBES.

SPECIFICATION forming part of Letters Patent No. 301,613, dated July 8, 1884.

Application filed November 16, 1883. (No model.) Patented in England March 2, 1883, No. 1,132.

*To all whom it may concern:*

Be it known that we, WILLIAM MAIDEN, JAMES MAIDEN, and EGBERT FLETCHER COWLEY, subjects of the Queen of Great Britain, residing at Hyde, in the county of Chester, England, have jointly invented new and useful improvements in tools or machines for screwing and cutting off metal pipes and tubes, also applicable to other tools for cutting metals, (patented in England by Letters Patent No. 1,132 of 1883, dated March 2, 1883,) of which the following is a specification.

Our improvements relate, primarily, to means for making, with speed and nicety, screw-threaded ferrules and nipples for use in the mechanical arts, and the same as thus applied are all embodied in a simple machine, as hereinafter set forth.

Our invention consists, first, in a "continuous cutter" of novel construction, adapted to preserve a thin sharp point without recourse to what is known as the "drawing-out" process, and to be readily adjusted and steadily held to its work, being readily made in convenient lengths of V shape in cross-section, sharpened upon the grindstone, and solidly held in a groove of corresponding shape, together with sandwiching-cutters of like construction to bevel the cut edges.

Our invention consists, secondly, in a peculiar combination of parts for holding the cutter, carrying the same around a pipe or tube to be cut, and automatically feeding it inward as the cutting progresses.

Our invention consists, thirdly, in a peculiar combination of parts for first "screwing" or screw-threading a pipe or tube and then cutting the same, to form ferrules or nipples and for like purposes, in one and the same simple machine.

A sheet of drawings accompanies this specification as part thereof.

Figure 1 of these drawings is a side view, and Fig. 2 a face view, of our said cutter as we prefer to construct it for the aforesaid primary use thereof. Fig. 3 represents a cross-section on the line 3 3, Fig. 1. Fig. 4 is a section similar to Fig. 3, illustrating a modification. Fig. 5 is a face view of our said machine with its driving-gear omitted, and Fig. 6 a side view thereof. Fig. 7 represents a longitudinal section of the cutter-head in the plane indicated at 7, Fig. 5. Fig. 8 is an internal view of this portion of the cutter-head; and Fig. 9 represents the reverse of Fig. 8, partly in section, as indicated at 9 9, Fig. 7.

Like letters of reference indicate corresponding parts in the several figures.

Our improved cutters $A$ $A'$ $A^2$ are produced from continuous lengths of bar-steel, of suitable angular shape, approximating V form in cross-section, by simply severing pieces of suitable length, appropriately hardening or tempering the same, and grinding the cutting end of each properly; and they are quickly resharpened at will by simply holding them on the grindstone at the proper angle. No "drawing out" is required.

For cutting off tubes, we prefer three cutters, or a three-part cutter, as shown in Figs. 1, 2, 3, 5, and 6. These fit side by side within an inwardly-tapering groove, B, in a cutter-bar, C, which is in turn inserted in a holder, D, and clamped therein by set-screws E. It will be apparent that before the cutters are tightened by said set-screws, they may be adjusted longitudinally, so as to project at the "nose" of the cutter-bar more or less, as may be desired, and that when so tightened they are immovably held in place and supported with steadiness against working strains. The central or main cutter, A, is set in advance of the sandwiching cutters $A'$ $A^2$, and performs the cutting-off operation, while the latter do the required beveling. In practice said main cutter effects a clean cut at right angles to the length of the tube, without raising a burr on the outside or inside of the tube, as heretofore common, an advantage which renders it particularly applicable for cutting off ferrules or nipples from lengths of screwed pipes and tubes without injuring the screw-thread. Said main cutter or a single cutter, A, may be used alone in some cases, as illustrated by Fig. 4, in a holding-groove, B, fitted thereto; but this is not claimed as new; and similar cutters with their holders may be used in lathes for screw-cutting purposes and the like, and in planingmills and other machine-tools for cutting or shaping metals. In our improved machine, Figs. 5 to 9, inclusive, said holder D is mounted in ways on the face of a radial bracket, F', which forms part of a cutter-head, F, driven by crank and gearing, as shown at the right in Fig. 6. The cutters are thus caused to revolve in operation. The outer end of said bracket F' carries a star-wheel, G, at the extremity of a spindle, G', which is geared to the ordinary feeding-screw, G², as means for turning the latter, and thereby moving the holder D inward to "feed" the cutters to their work; and an adjustable stud, H, Fig. 6, conveniently located on the bed of the machine in the path of said star-wheel, as it revolves with the cutters, rotates said star-wheel, and thus feeds the cutters automatically. An ordinary clamp or vise, I, provides for holding the pipe or tube J while it is being cut, said vise and the remainder of the machine having a single bed, K, of simple form.

To provide for screwing or screw-threading pipes or tubes in the same machine, the hub of the cutter-head F is made tubular, and provided with radial screwing or screw-cutting "dies" a, as shown in dotted lines in Fig. 6 and by Figs. 7, 8, and 9, and the clamping-vise I is made movable longitudinally on its bed, as indicated by arrow in Fig. 6. It is so shown in the drawings. Ordinary means for so moving it, such as a longitudinal screw or a pinion and rack, would of course be used in practice. A pair of said dies a are mounted in diametrically-opposite dovetailed grooves in the face of said hub of the cutter-head, and the inner end of each die is recessed to form three (or more) cutting-edges, i, distributed around the circumference of the pipe or tube when at work, as clearly seen in Fig. 9. By thus completely surrounding the pipe or tube with numerous cutting-edges we approach as near as possible to a solid screwing-die, and avoid the possibility of splitting the pipe or tube. For automatically forcing said dies a inward when the cutter-head is revolved in a given direction, (indicated by arrow in Figs. 8 and 9,) cam-projections b b are formed within the front or outer part, c, of the cutter-head, and for retracting the same automatically when the motion of the cutter-head is reversed, it is provided internally with cam-grooves d d, coacting with stud-pins e on the dies. Said cam-grooves are added in dotted lines in Fig. 9, so as to make this figure illustrate the whole operation.

Instead of mounting our improved cutting-off cutters in a machine, as hereinbefore described, it will be readily apparent that the same may be mounted and used in the ordinary hand-tool cutters.

Having thus described our said improvements, we claim as our invention—

1. The within-described three-part cutting-off cutter, composed of a central main cutter and a pair of sandwiching cutters for beveling the cut edges, each of angular shape approximating V form in cross-section, independently adjustable longitudinally, and clamped within one and the same cutter-bar in a suitable holder, substantially as shown, for the purposes set forth.

2. The combination, as herein specified, of the hollow hub F with its radial bracket F' and devices for revolving the same, the radially-sliding cutter-holder D, provided with a cutter or cutters, the customary feed-screw, G², the shaft G', parallel with said feed-screw, spur-gearing connecting said feed-screw and shaft, the star-wheel G on the outer extremity of said shaft G', and the adjustable stud H on the base of the machine in the path of said star-wheel, substantially as shown and described, for the purposes set forth.

3. In a machine for screwing and cutting off pipes and tubes, the combination, as herein specified, of the hollow hub F, with its radial cutter-carrying bracket F', and devices for revolving the same, said hub being recessed and provided internally with radially-sliding threading-dies a a, which revolve with said hub, and cams b b and cam-grooves d d, for advancing and retracting said dies automatically, and the non-rotary vise I, movable bodily in line with the axis of said hub, substantially as shown and described, for the purposes set forth.

In testimony whereof we affix our signatures in presence of two witnesses.

WILLIAM MAIDEN.
JAMES MAIDEN.
EGBERT FLETCHER COWLEY.

Witnesses:
JOHN G. WILSON,
GEORGE H. RICHMOND.